July 17, 1956  M. H. ALLDREDGE  2,755,116
JOINT
Filed Nov. 19, 1952
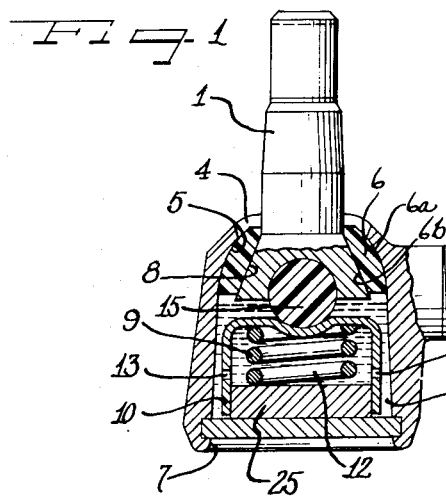
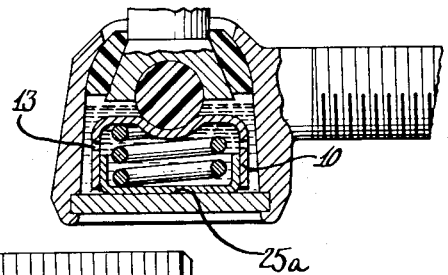
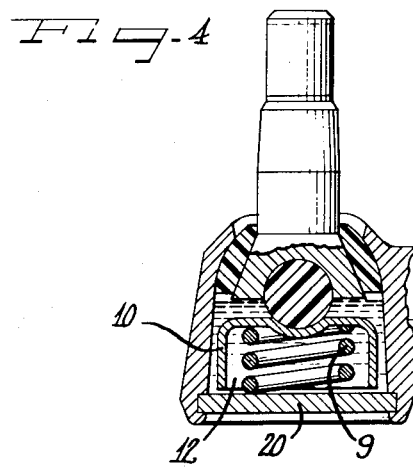
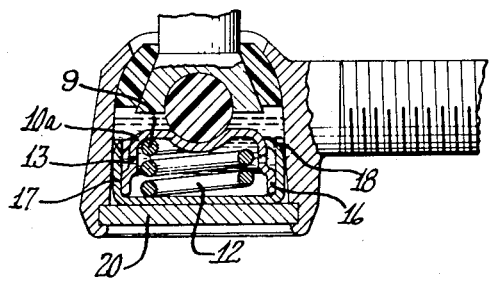
Inventor
Marshall H. Alldredge

United States Patent Office 2,755,116
Patented July 17, 1956

2,755,116

JOINT

Marshall H. Alldredge, Detroit, Mich., assignor to Thompson Products, Inc., Cleveland, Ohio, a corporation of Ohio Application November 19, 1952, Serial No. 321,334

6 Claims. (Cl. 287—90)

This invention relates to ball joints and more particularly to joints which comprise a socket attached to one member and a universally mounted stud secured in said socket and attached to a second member so that the first and second members may be universally pivoted relative to each other.

One of the major uses of such joints has been as the connecting joints for automotive steering linkages. In such installations, it is necessary that the joints between the tie rods and steering arms be of the universal type, be capable of taking up wear thereby preventing slack in the steering system, and also that they be extremely strong and vibration free.

I am aware that a very large number of patents have issued dealing with the manufacture of such joints and large numbers of commercial embodiments have been manufactured over the years. However, to my knowledge, none of the patented or commercial embodiments has proved completely satisfactory in the extremely heavy duty use of automotive steering.

The main reason for the failing of the prior art devices is that the provision of resilient wear take-up means has also added a problem of excess vibration of the joint when operating the vehicle over rough roads. This excess vibration causes the ball or universal pivot surfaces of the joint to separate from each other thereby giving a sloppy steering action, a condition which is extremely undesirable and dangerous. It is therefore an object of the present invention to provide a ball and socket type joint having a resilient wear take-up provision and yet which is not subject to the difficulties mentioned above.

Another object of the present invention is to provide a ball joint which allows slow changes of position but which provides rigidity on impact.

A feature of the present invention is the use of silicone polymer as a joint stabilizing agent.

Another feature of the invention resides in the use of plastic bearing surfaces which do not require external lubrication.

Another object of the present invention is to provide a completely sealed, automatically adjusting tie rod or similar ball joint which positively prevents separation of the bearing surfaces therein as a result of impact loads suffered during operation.

Still another feature of the present invention is the provision of an automatic wear compensating joint which is not subject to noise-producing vibration between the joint parts.

Yet another object is to provide an extremely simple, readily manufactured, and hence inexpensive ball joint which is capable of accurate operation during extremely heavy operational loads including those due to impact of vibration.

Still another and further object of the present invention will become apparent to those skilled in the art from a consideration of the attached drawings in which I have shown several embodiments of the present invention by way of illustration only.

On the drawings:

Figure 1 is a side elevational view partly in cross-section disclosing the novel dampening reservoir of my invention;

Figure 2 is a modification shown in partial cross-section and showing the use of sheet metal stampings;

Figure 3 is a further modification shown in partial cross-section and showing a sheet metal container for the silicone fluid which may be manufactured as a sub-assembly for insertion into the socket as a unit; and Figure 4 is a still further modification shown in partial cross-section and which utilizes a single supporting plate completely surrounded by the silicone fluid.

As shown on the drawings:

As may be seen clearly from Figure 1, a stud 1 is mounted for universal movement in a socket 2 carried by the bar 3. The socket 2 has an aperture 4 at one end thereof for the passage of the stud 1 and a segmental-spherical bearing surface 5 located at a point adjacent the opening 4 for contact with a bearing ring 6. At the opposite end of the socket 2 an opening 7 is provided through which the stud 1 and the remaining parts of the joint may be assembled.

As is clearly shown in Figure 1, the bearing ring 6 has a segmental spherical surface 6a which cooperates with the surface 5 to permit a tilting of the bearing in the socket. The stud has a frusto-conical surface 8 which cooperates with a similar tapered surface 6b in the bearing ring 6. These surfaces permit the stud to rotate relative to the ring 6 about the longitudinal axis of the stud.

In order to maintain the stud 1 against the bearing ring, and the bearing ring against the segmental spherical surface 5, a biasing force is applied against the base of the stud by means of a spring 9. This spring acts against a washer or piston 10 which in turn acts on the ball member 11 embedded in the base of the stud.

While it is conventional to so utilize a spring and washer acting against a portion of the stud to maintain it in position against a bearing surface, the prior art construction failed to provide any satisfactory means of preventing impact shocks from jarring the stud 1 downwardly against the force of the spring thereby separating the bearing surfaces 8, 6b, 6a and 5 from each other. Sudden return of the bearing surfaces into contact with each other upon diminishing of the shock force causes a loud noise and also, the vibration caused by this shifting of components tends to cause a sloppy feeling in the steering system as above described.

In order to obviate these difficulties, the construction 1 shown in Figure 1 utilizes a body of fluid 12. The fluid 12 is preferably of one of the newly developed polymers which has the physical characteristics of being able to flow or distort under gradually applied loads but which will become substantially rigid under impact forces. An example of such a material is the silicone elastic polymer disclosed in Modern Plastics, November 1944, at page 125, as well as in United States Patent No. 2,570,853, although it is contemplated that other compounds having similar characteristics could be utilized.

The washer or piston 10 is provided with a plurality of small orifices 13. These orifices will permit the flow of the material 12 back and forth between the cavity inside of the cup-shaped washer 10 and the outer reservoir 14. In operation, therefore, the spring 9 will bias the stud upwardly against the surface 5 and during this initial seating, the polymer 12 will flow under the gradual force of its own weight inwardly from the reservoir 14 into the cup-shaped washer 10 until the entire space between the washer and the backing plate 15 is full of the fluid.

It is then possible to move the stud 1 relative to the socket only upon the application of a gradual force thereto sufficient to overcome the spring 9. Upon such a gradual application of force, the material 12 offers no substantial resistance to movement and flows back and forth through the apertures 13. However, should an impact force be applied to the stud 1, the material 12 acts as a positive mechanical link in the system and no movement whatever is permitted between the stud 1 and the socket 2.

In view of the fact that the silicone polymer or other similar material of a special nature is utilized in tie rod or other ball joint socket of the present invention, it is preferable that no conventional lubricant be used. In absence of the usual lubricating grease, it is therefore necessary to provide other means of preventing excess wear on the relatively moving parts. As is disclosed in this application, I contemplate using plastic bearing surfaces. For example, the bearing ring 5 can be completely manufactured of nylon, as can the spherical bearing member 15. While nylon has proven to be an exceedingly good bearing material since it does not require lubricant when coacting with steel, it is possible to use other similar bearing materials which do not require constant lubrication. In this connection, it is, of course, possible to utilize materials which will slide freely in the surrounding of the silicone polymer 12 since this polymer is in splash contact with the parts.

In the modification shown in Figure 2, I have shown a construction utilizing sheet metal exclusively. In utilizing this material, I have substituted for the solid guide member 25 a sheet metal cup-shaped member 25a, the sides of which engage the inner walls of the cup member 10 for guiding and sealing action.

Figure 3 discloses a modified construction which is designed to permit the use of sub-assembly techniques in the construction of the joint of the present invention. In that figure, the piston 10a is provided with an outwardly extending flange 16. A cup 17 is slidably positioned outside of the piston 10a and has its periphery crimped at 18. The projection 16 cooperates with the crimped portion 18 to prevent the complete separation of the members 10a and 17. This permits the assembly of the members 10a, 9 and 17 with polymer 12 therein together as a unit. During the assembly of the joint, it is thus possible to place this unit in the joint, add a small amount of the polymer 12 to the socket 2 and then position the bottom plate 20 against the member 17 for retaining the entire assembly in an assembled condition.

Since the crimps 18 are spaced about the periphery of the member 17, the spaces between the crimps provide passageways for the polymer to move from within the cup 10a through the openings 13 to the reservoir space 14.

In Figure 4, I disclose a further modification which has the advantage of extreme inexpensiveness. In that construction, the cup 10a is maintained in suspension in the polymer 12 by the spring 9 without any external guide means such as the member 25. It has been found that the space between the cup member 10 and the bottom plate 20 is sufficient to act as a slightly restrictive orifice thereby preventing free movement of the polymer 12 from within the piston 10 to the outer reservoir. It is, of course, noted here that orifices are not necessarily of extensive restriction when used with a polymer of the type above mentioned since the polymer has the characteristic of becoming practically a solid upon impact. Under these conditions, the orifices are necessary mainly to permit gradual flow between the inside of the piston 10 and the reservoir 14 to allow the piston 10 to reciprocate in the taking up of natural wear and in the initial assembly procedure.

It will be apparent from the above disclosure that I have provided a novel ball and socket joint which provides the flexibility of the prior joints as well as the ability to take up wear, but which has eliminated the problem of separation of the bearing surfaces under impact, a condition inherent in prior art constructions.

It will be understood that modifications and variations may be effected without departing from the scope of the novel concepts of the present invention.

I claim as my invention:

1. A vibration damping joint comprising a first member having a socket therein, said socket having an aperture at one end thereof, a bearing ring supported in said aperture and having a segmental spherical external bearing surface for contact with a cooperating surface adjacent said aperture, a stud carried by said bearing ring for rotary movement relative thereto, means for biasing said stud against said bearing ring and said bearing ring against said socket, and impact resisting means associated with said biasing means to prevent the separation of said stud from said bearing ring and said bearing ring from said socket upon the application of impact forces to said stud, said last mentioned means comprising a piston movable with said stud in a body of material in said socket having the characteristic of fluidity under gradual applications of pressure and rigidity under impact forces.

2. A vibration damping ball and socket joint, comprising a socket having a segmental spherical internal bearing wall therein, an aperture in said wall, and a bearing ring having a segmental external bearing surface for cooperation with said wall and having a stud rotatably mounted therein, means for preventing axial movement of said stud through said aperture, biasing means for maintaining said stud against said bearing ring and said bearing ring against said wall, said biasing means comprising a piston acting against said stud in the direction of said aperture and being positioned in a body of material which will permit said piston to move gradually toward or away from said stud but which is rigid upon the application of impact forces to said stud whereby said stud is prevented from movement relative to said socket as a result of impact forces applied to either said stud or said socket.

3. A joint comprising a stud mounted for universal movement in a socket, means biasing said stud into contact with a bearing wall in said socket and second means for preventing movement by said stud against said biasing means under impact forces, said second means comprising a piston member mounted for movement with said stud and positioned in said socket in a body of material having the characteristic of fluidity under the application of gradually applied force and rigidity under the application of an impact force.

4. A ball and socket joint comprising a socket having a segmental spherical bearing wall therein, an aperture in said bearing surface, a stud in said aperture mounted for tilting movement with respect thereto, combined biasing and vibration dampening means for biasing said stud against said bearing surface, said last named means comprising a cup-shaped piston member supported by said stud for movement with the stud, guide means associated with said piston for maintaining said cup in axial alignment with said stud, spring means between said cup and said guide member tending to force them apart, an aperture in said cup and a material in and about said cup for controlling the movement thereof, said material having a characteristic of fluidity under gradual forces applied to said cup and rigidity under impact forces applied thereto.

5. A vibration damping joint comprising a stud mounted for universal movement in a socket, means biasing said stud into contact with a bearing wall in said socket and second means for preventing movement by said stud against said biasing means under impact forces, said second means comprising a piston member mounted for movement with said stud and positioned in said socket in a body of material having the characteristic of fluidity under the application of gradually applied forces and rigidity under the application of an impact force, and by-pass means permitting the gradual flow of material from one side of said piston to the opposite side thereof under the influence of gradually applied forces.

6. A joint comprising a stud mounted for universal movement in a socket, means biasing said stud into contact with a bearing wall in said socket and second means for preventing movement by said stud against said biasing means under sharply applied impact forces, said second means comprising a member mounted for positive movement by said stud when said stud is moved away from said bearing wall against the force of said biasing means, said member being positioned in contact with a body of material having the characteristic of fluidity under the application of gradually applied force and rigidity under the application of an impact force.

References Cited in the file of this patent

UNITED STATES PATENTS

| | | |
|---|---|---|
| 842,055 | Barnard | Jan. 22, 1907 |
| 1,140,637 | Voight | May 25, 1915 |
| 1,458,331 | Garman | June 12, 1923 |
| 1,608,276 | Groves | Nov. 23, 1926 |
| 2,054,082 | Hufferd | Sept. 15, 1936 |
| 2,236,062 | Katcher | Mar. 26, 1941 |
| 2,359,915 | Hussman | Oct. 10, 1944 |
| 2,397,640 | Bingham | Apr. 2, 1946 |
| 2,541,234 | Fulton | Feb. 13, 1951 |
| 2,570,853 | Pierce | Oct. 9, 1951 |
| 2,570,854 | Pierce | Oct. 9, 1951 |
| 2,629,462 | Peek | Feb. 24, 1953 |

OTHER REFERENCES

Modern Plastics, page 124, November 1944.